United States Patent Office 3,453,262
Patented July 1, 1969

3,453,262
COMPOSITION OF MATTER
Hugh J. Roberts, La Grange, Ill., assignor to Corn Products Company, New York, N.Y., a corporation of Delaware
No Drawing. Filed Dec. 18, 1964, Ser. No. 419,555
Int. Cl. C13l 1/08; C09b 19/06
U.S. Cl. 260—233.3
9 Claims

ABSTRACT OF THE DISCLOSURE

Fluorescent starch compounds useful in detergents, textile finishes and proper are prepared by admixing a solution of a cationic fluoresent brightening agent such as a substituted ethene or an anionic brightening agent such as a substituted stilbene sulfonic acid with an aqueous slurry of granular ionic starch derivative having an ionic charge opposite that of the brightening agent.

---

This invention relates to the production of starches having improved whiteness. More specifically, it relates to the production of novel starch compositions wherein a fluorescent brightening agent is irreversibly bound as a counter-ion to an ionic starch derivative.

All starches are nominally white; however, all starches do not appear identically white. Starches commonly vary in their appearance from slightly yellow to gray. The degree to which a starch approaches a true white is determined by the degree to which it reflects equally all wavelengths of the visible light spectrum. A starch having a gray cast reflects only a fraction of the total incident light, absorbing all wavelengths approximately equally. A yellowish starch absorbs more strongly in the blue region of the spectrum.

It is possible to increase the whiteness of starches by chemical bleaching, which often results in chemical damage to the starch. The whiteness of starches may also be increased by treating them with certain fluorescent compounds. These compounds, commonly referred to as optical bleaches, optical brightening agents, and fluorescent brightening or whitening agents, function by absorbing the invisible, ultraviolet radiation present in daylight and in certain artificial lights, and converting it to visible light, thus increasing the total amount of light apparently reflected by the starch. The adsorption of certain substantive fluorescent compounds by starch and the use of the resulting optically brightened starches in the finishing of cotton fabric is described by H. L. Sanders in Canadian Patent 518,497, issued Nov. 15, 1955. The amount of fluorescent compound which may be substantively fixed on starch is small, however; and since, as in all adsorptive processes, the fluorescent agent used is partitioned between the solvent and the starch, only part of the total amount added is retained by starch.

The main object of this invention is to provide starch derivatives of increased whiteness. Another object is to increase the whiteness of starch derivatives without chemically altering the starch molecules. A third object is to increase the capacity of starches for binding fluorescent brightening agents. Still another object is to provide a process whereby essentially all of a fluorescent brightening agent is removed from solution by reaction with a starch.

Many of the fluorescent compounds commonly used as optical brightening agents in detergents, in textile finishes, and in paper are chemically related to the dyestuffs; in fact, they are sometimes called fluorescent dyes. Particularly closely related to each other are the fluorescent compounds of the triazinylstilbene type and the reactive dyestuffs of the chlorotriazine type. It is thus apparent to one skilled in the art that the objects of this invention might be accomplished by the synthesis of a reactive fluorescent dye having, for example, a chlorotriazinylstilbene structure, and subsequent reaction of such a compound with starch or a starch derivative by heating in the presence of a base. A process has recently been described wherein cellulosic materials are brightened in this manner (British Patent 864,900; Apr. 12, 1961).

I have discovered that the objects of this invention can be accomplished without recourse to specially synthesized reactive fluorescent dyes, without the need for heating, and without the addition of any other chemicals to the system. I have discovered that the behavior of ionic starch derivatives toward fluorescent brightening agents is markedly different from the behavior of underivatized starch which is described in Canadian Patent 518,497. The nature of this unique behavior is such that a cationic starch will completely adsorb an anionic fluorescent brightening agent from an aqueous solution while an anionic starch binds almost none of the same brightener. Conversely, anionic starch derivatives have an increased capacity for binding cationic brighteners.

The ability of ionic macromolecules to exchange their counter-ions is a well-known phenomenon upon which the widely used process of ion-exchange is based. Unlike the ordinary process of ion-exchange, however, the binding of fluorescent brightening agent by ionic starch derivatives is irreversible: the brightener is not removed by washing and the exchange is unaffected by high concentrations of neutral salts.

The practice of this invention is remarkably simple. A solution of an anionic fluorescent brightening agent is added to an aqueous slurry of a granular cationic starch derivatives. The slurry is mixed thoroughly; and the product may be isolated, if desired, by filtration. Conversely, an anionic starch derivative is similarly treated with a solution of a cationic fluorescent brightening agent. Should it be desirable to whiten an ionic starch derivative in the gelatinized state, the fluorescent agent may be added either to the starch before cooking, or directly to the paste prior to the isolation of the starch product either by drying or by precipitation.

The fluorescent brightening agents used to whiten cationic starch derivatives by the process of my invention are anionic compounds. Typical of the anionic fluorescent compounds which may be used are compounds from the class of stilbene sulfonic acids represented by the formula

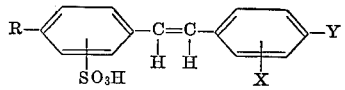

wherein R represents an alkylamino, arylamino, aroylamino, triazinylamino, benzotriazolyl, naphthotriazolyl, or arylureido group; X represents a hydrogen atom or a sulfonic acid group; and Y represents a hydrogen atom or an amino, alkylamino, arylamino, aroylamino, triazinylamino, benzotriazolyl, naphthotriazolyl, arylureido or 2- arylethenyl group; and the water-soluble salts thereof. Other anionic fluorescent compounds which are useful in the practice of this invention include the benzidenesulfone disulfonates represented by the formula

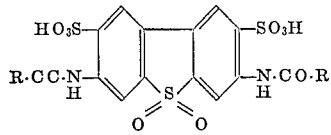

wherein R represents an alkyl or an aryl group, and the water-soluble salts thereof.

The fluorescent brightening agents used to whiten anionic starch derivatives by the process of this invention are cationic compounds. Typical of the cationic fluorescent compounds which may be used are compounds taken from the class of substituted ethenes represented by the formula

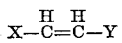

wherein X and Y are taken from the group consisting of benzimidazolyl, benzoxazolyl, benzothiazolyl, benzotriazolyl, and naphthotriazolyl radicals; compounds taken from the class of the water-soluble acid salts of oxacyanines represented by the formula

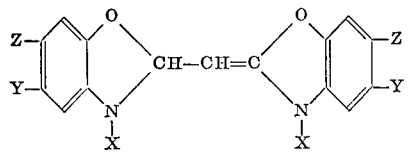

wherein X, Y, and Z are taken from the group consisting of hydrogen, alkyl and aryl radicals; and compounds taken from the class of the water-soluble acid salts of aminocoumarins represented by the formula

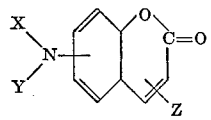

where X, Y, and Z are taken from the group consisting of hydrogen, alkyl and aryl radicals.

The amount of the fluorescent compound needed to improve the whiteness of an ionic starch derivative will vary with the nature of the fluorescent compound, the nature of starch derivative and the degree of whiteness desired. Generally, however, the amount used will be between $10^{-5}$ and $10^{-2}$ mole of brightening agent per mole of starch, a mole of starch being defined as 162 grams dry weight. Preferably the ratio will lie between 0.0005 and 0.003 mole of brightener per mole of starch. At concentrations greater than 0.003 mole per mole, the starch may be tinted by the color of the brightening agent, which is often bright yellow; at these higher concentrations, therefore, the optically brightened starch derivatives are are best suited for uses wherein they will be gelatinized, as by cooking.

The amount of water used should be sufficient to provide for a readily mixed slurry of the starch derivative and to dissolve the fluorescent brightening agent. The latter compounds will vary in their solubility characteristics, many being only slightly soluble in water. However, the amounts required by the process of this invention are so small that limited solubility is not a problem. However, if it is desired to use a fluorescent brightening agent at a concentration in excess of its solubility in water, a water miscible organic solvent, such as ethanol, methanol, isopropanol, acetone, or 1,4-dioxane may be added in an amount sufficient to provide the necessary solubility.

The starch derivatives which may be whitened by the process of this invention carry a formal charge. They may be cationic derivatives; for example, the acid salts of dialkylaminoethyl ethers of starch, the acid salts of 2-hydroxy-3-dialkylaminopropyl ethers of starch, salts of 2-hydroxy-3-trialkylammoniopropyl ethers of starch or other cationic amine, phosphonium or sulfonium derivatives. They may also be anionic derivatives; for example, starch sulfate, starch phosphate, carboxyalkyl ethers of starch, and other anionic starches.

The starch derivatives may be prepared from corn (maize) starch, including the high amylose and waxy varieties, from wheat, sorghum, waxy sorghum, potato, tapioca, rice or any other cereal or tuber starch. In addition, ionic derivatives of the starch fractions, amylose and amylopectin, may be similarly brightened.

In the process of mixing the solution of the fluorescent brightening agent with the starch derivative slurry, the duration of mixing is not critical, as the binding process occurs almost instantaneously. The pH of the system need be controlled only when it is necessary to maintain the starch derivative or the fluorescent brightening agent in the desired ionic state; thus quaternary ammonium starch derivatives maintain their cationic charge over the entire pH range, while tertiary amino starch derivatives lose their cationic charge at an alkaline pH. Similarly, carboxylated starches lose their anionic charge at an acid pH. The fluorescent compounds having a stilbene sulfonate type structure also become somewhat less anionic below pH 4; and most of the cationic brightening agents function best at neutral to acid pH's. The fluorescent brightening agents also exhibit maximum solubility in water at a pH corresponding to their fully ionized states.

The optically brightened starch derivatives prepared by the process of this invention are useful in all applications of the corresponding unbrightened starch derivatives wherein increased whiteness is desirable. For example, they are useful as sizing agents in the manufacture of textiles, as laundry sizes, as sizing agents in the manufacture of paper and paperboard, as beater additives in the manufacture of paper and paperboard, as binders in paper coatings, as binders in pelletizing and tablet making, and as soil suspending agents in detergent formulations.

My invention is further described by the following examples which are illustrative only, and which in no way limit its scope. Quantitative measurements of the degree of whiteness were obtained by means of a Coleman photofluorometer modified to perform as a reflectance meter in which the powdered sample was illuminated with ultraviolet light (363 m$\mu$ peak) and the emitted visible light (400–600 m$\mu$) activated a photocell-galvanometer circuit. The meter readings between 10 and 80 were found to be directly proportional to the logarithm of the concentration of the fluorescent compound in the optically brightened starch derivative.

EXAMPLE I

This example illustrates the unique behavior of ionic starch derivatives toward an anionic fluorescent brightening agent.

Three starch slurries were prepared by mixing 0.33 mole of each of the following in 100-ml. portions of water:

(1) A cationic starch: 2-hydroxy-3-trimethylammoniopropyl starch chloride, 0.033 D.S., 10 fluidity.
(2) A nonionic starch; 20 fluidity corn starch.
(3) An anionic starch: starch sulfate, 0.025 D.S., 10 fluidity.

To each slurry was added 7.5 ml. of water containing $10^{-4}$ mole of an anionic fluorescent brightening agent of the diaminostilbene disulfonate type. The structural formula of the brightener was

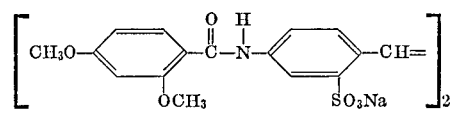

The slurries were mixed thoroughly, filtered, and the filtrates retained. The filter cakes were washed with 1000 ml. of water and the treated starches were air-dried and ground to pass a 50-mesh sieve. The above was repeated without the addition of the brightening agent. The filtrates were analyzed for the stilbene derivative by ultraviolet spectrophotometry, and the amount of brightening agent retained by each starch was calculated. The starches were examined for whiteness both visually and instrumentally. The results are listed in Table I.

TABLE I

| Starch | Brightener added (mole/mole) | Visual appearance | Percent brightener retained | Fluorometer reading |
|---|---|---|---|---|
| Anionic | None | Unchanged | | 1 |
| Nonionic | None | do | | 1 |
| Cationic | None | do | | 1 |
| Anionic | $3 \times 10^{-4}$ | do | 6 | 4 |
| Nonionic | $3 \times 10^{-4}$ | Somewhat whiter | 22 | 31 |
| Cationic | $3 \times 10^{-4}$ | Whitest | 100 | 65 |

EXAMPLE II

This example shows that the fluorescent brightening agent is not removed from the ionic starch derivative by washing.

To each of 5 slurries containing 0.33 mole of the cationic starch, 2-hydroxy-3-trimethylammoniopropyl starch chloride (0.033 D.S.), and 4.9 grams of sodium chloride in 150 ml. of water was added 100 ml. of aqueous solution containing increasing amounts of a commercial optical brightening agent of the diaminostilbene disulfonate type. The sodium chloride was added to aid the subsequent filtration. The undiluted brightener contained 3.1% sulfur, corresponding to $5 \times 10^{-4}$ mole per gram; the amounts added are listed in Table II. The slurries were filtered, and the filter cakes were air-dried, ground to pass a 50-mesh sieve, and the whiteness of each sample was determined instrumentally. A 25-gram portion of each sample was then washed by slurrying in 500 ml. of water and filtering by suction. The filter cakes were dried, ground, and measured as before. A 20-gram portion of each of the washed samples was further washed by slurrying it in 500 ml. of water containing 1.8 grams of sodium chloride, filtering, drying, and grinding; again the whiteness was measured. The results (Table II) show that washing with water or with salt solution does not remove the brightening agent. The increases in whiteness in the samples to which 4 grams and 10 grams of brightener were added are due to the removal by washing of some of the yellow color imparted by the excessive amount of brightener present.

TABLE II

| Amount of brightener added | | Fluorometer reading | | |
|---|---|---|---|---|
| Grams | Mole/mole of starch | Initial | After 1st wash | After 2nd wash |
| 0.2 | $3 \times 10^{-4}$ | 61 | 62 | 62 |
| 0.5 | $7.5 \times 10^{-4}$ | 80 | 80 | 80 |
| 1.0 | $1.5 \times 10^{-3}$ | 87 | 88 | 86 |
| 4.0 | $6 \times 10^{-3}$ | 84 | 90 | 99 |
| 10.0 | $1.5 \times 10^{-2}$ | 75 | 84 | 85 |

EXAMPLE III

This example illustrates the retention of a fluorescent brightening agent by an ionic starch derivative during cooking and solvent precipitation.

The 10-gram sample from Example II which represented the addition of $1.5 \times 10^{-2}$ mole of brightener per mole of starch followed by washes with water and with salt solution was cooked in 400 ml. of water at 90° C. for 10 minutes. The cooled paste was poured into 550 ml. of acetone. The supernatant liquid was decanted from the precipitate, and the latter was slurried in 250 ml. of acetone, which was again decanted. After a similar wash with 250 ml. of ethanol, the precipitate was again slurried in 250 ml. of ethanol and the slurry was filtered. The filter cake was air-dried, and the whiteness measured as before:

Fluorometer reading before cooking: 85; visual appearance—yellowish.
Fluorometer reading after cooking, acetone precipitation and ethanol extraction: 92; visual appearance—white.

EXAMPLES IV–XII

These examples illustrate the whitening of cationic starch by nine different commercial anionic brightening agents of the diaminostilbene disulfonate or bis(triazinylamino) stilbene disulfonate type (Table III). Four of the agents were liquids (solutions) and five were solids. The cationic starch, 2-hydroxy-3-trimethylammoniopropyl starch chloride (0.003 D.S.), was whitened as described in Example II.

TABLE III

| Example | Type of brightener | Percent sulfur in brightener ("as is") | Fluorometer reading | |
|---|---|---|---|---|
| | | | $1.5 \times 10^{-4}$ mole brightener per mole starch | $3 \times 10^{-3}$ mole brightener per mole starch |
| 4 | Liquid | 1.6 | 69 | 113 |
| 5 | do | 2.0 | | 101 |
| 6 | do | 3.1 | 58 | 102 |
| 7 | do | 3.3 | 37 | |
| 8 | Solid | 3.3 | | 108 |
| 9 | do | 3.5 | 37 | ¹86 |
| 10 | do | 5.2 | 54 | |
| 11 | do | 6.5 | | 107 |
| 12 | do | 8.7 | 58 | 96 |

¹ Potassium chloride was used in place of sodium chloride in the whitening process.

EXAMPLE XIII

This example illustrates the unique behavior of ionic starch derivatives toward a cationic fluorescent brightening agent.

Two starch slurries were prepared by mixing 0.33 mole of each of the following in 100-ml. portions of water:

(1) An anionic starch: starch phosphate, 0.02 D.S..
(2) A cationic starch: 2-hydroxy-3-trimethylammoniopropyl starch chloride, 0.033 D.S.

To each slurry was added 100 ml. of an aqueous solution containing $7.5 \times 10^{-4}$ mole of cationic fluorescent brightening agent belonging to the class of compounds having the structural formula

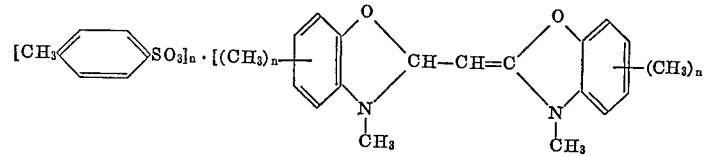

where $n = 1$ or 2.

The pH of each slurry was adjusted to $6.5 \pm 0.1$, and the slurries were filtered. The filter cakes were then washed by slurrying in 500 ml. of water at pH 6.5, filtered and dried. The whiteness of the washed samples was measured. The fluorometer readings were as follows: anionic starch 46; cationic starch 6.

EXAMPLE XIV

The example illustrates the use of an optically brightened cationic starch as a wet-end additive in paper making.

Handsheets were prepared from bleached sulfite pulp containing those starches listed in Table IV. The cationic starch used was a 0.035 D.S. 2-hydroxy-3-trimethylammoniopropyl starch chloride. The optically brightened cationic starch was prepared from the same cationic starch by the addition of $1.7 \times 10^{-3}$ mole of a commercial optical brightening agent of the diaminostilbene disulfonate type. The whiteness of the resulting sheets was measured fluorometrically.

TABLE IV

| Sheet No. | Additive | Visual appearance | Fluorometer reading |
|---|---|---|---|
| 1 | None | White | 3 |
| 2 | 1% cationic starch | Same as No. 1 | 3 |
| 3 | 1% optically brightened cationic starch | Whiter than No. 1 | 15 |
| 4 | 2% cationic starch | Same as No. 1 | 3 |
| 5 | 2% optically brightened cationic starch | Much whiter than No. 3 | 51 |

I claim:

1. A process of producing a starch derivative having improved whiteness which comprises admixing a solution of an ionic fluorescent brightening agent with an aqueous slurry of a granular ionic starch derivative having an ionic charge opposite that of the brightening agent.

2. A process of producing a starch derivative having improved whiteness which comprises admixing a solution of a cationic fluorescent brightening agent with an aqueous slurry of a granular anionic starch derivative.

3. A process of producing a starch derivative having improved whiteness which comprises admixing a solution of an anionic fluorescent brightening agent with an aqueous slurry of a granular cationic starch derivative.

4. The process of claim 2 wherein the anionic starch derivative is a phosphate ester of starch.

5. The process of claim 3 wherein the fluorescent brightening agent is of the stilbene disulfonate type.

6. The process of claim 3 wherein the starch derivative is a quaternary ammonium ether of starch.

7. The process of claim 3 wherein the starch derivative is a tertiary amino ether of starch.

8. A new composition of matter consisting essentially of the reaction product of a cationic fluorescent brightening agent and a granular anionic starch derivative.

9. A new composition of matter consisting essentially of the reaction product of an anionic fluorescent brightening agent and a granular cationic starch derivative.

References Cited

UNITED STATES PATENTS

| | | | |
|---|---|---|---|
| 3,277,079 | 10/1966 | Bress | 260—232 |
| 3,271,321 | 9/1966 | Stilz | 252—301.2 |
| 3,173,841 | 3/1965 | Roth | 117—33.5 |
| 3,142,531 | 3/1965 | Rogers | 117—33.5 |
| 3,021,257 | 2/1962 | Slauffenberg | 162—162 |

DONALD E. CZAJA, *Primary Examiner.*

R. W. MULCAHY, *Assistant Examiner.*

U.S. Cl. XR

106—213; 117—33.5; 252—301.2